United States Patent [19]

Kober et al.

[11] Patent Number: 4,686,475
[45] Date of Patent: Aug. 11, 1987

[54] PASSIVE GEOPHYSICAL PROSPECTION SYSTEM BASED UPON THE DETECTION OF THE VERTICAL ELECTRIC FIELD COMPONENT OF TELLURIC CURRENTS AND METHOD THEREFOR

[75] Inventors: Carl L. Kober; H. David Procter-Gregg, both of Littleton, Colo.

[73] Assignee: Denver Mineral Exploration Corp., Highlands Ranch, Colo.

[21] Appl. No.: 630,432

[22] Filed: Jul. 12, 1984

[51] Int. Cl.$^4$ ............................................. G01V 03/12
[52] U.S. Cl. .................................... 324/349; 324/347
[58] Field of Search ................................ 324/347–351, 324/353, 72, 117 R, 126, 6 QS, 332, 344, 72.5; 364/420–422; 73/151, 861.12; 340/870.37; 455/40, 41, 269; 381/17, 25, 99, 100

[56] References Cited

U.S. PATENT DOCUMENTS

| | | | |
|---|---|---|---|
| 3,087,111 | 4/1963 | Lehan et al. | 324/344 |
| 3,136,943 | 6/1964 | Slichter | 324/344 |
| 3,398,356 | 8/1968 | Still | 324/344 X |
| 3,866,111 | 2/1975 | Warren | 324/344 X |
| 3,986,207 | 10/1976 | Gerbel et al. | 324/350 X |
| 4,434,508 | 2/1984 | Sommer | 381/17 X |
| 4,507,611 | 3/1985 | Helms | 324/348 X |

FOREIGN PATENT DOCUMENTS

| | | | |
|---|---|---|---|
| 276835 | 12/1964 | Australia | 324/332 |
| 875554 | 5/1953 | Fed. Rep. of Germany | 324/347 |
| 634218 | 11/1978 | U.S.S.R. | 324/349 |

OTHER PUBLICATIONS

Simnacher, "Device Raises Controversy Among Drillers", *The Dallas Morning News*, Feb. 8, 1986, pp. 1G–2G.
"The Petro-Sonde © Service . . ." *Geophysics International* 1982.
Zabolotnaya, "Effect of The First Layer . . . Magnetotelluric Sounding", *Fizika Zemli*, No. 4, 1968, pp. 112–114.
Tabavovskii, "Field in Media . . . Series of E-and H-Polarizations," *Geol. Geofiz,* 1969, No. 1, 102–109.
Dobrin, "Introduction to Geophysical Prospecting", McGraw Hill (3rd Ed. 1976) pp. 591–601.
Wait, "Geo-Electromagnetism" (1982) Academic Press Inc., pp. 114–116 and 209–234.
Burrell et al., "Pulse Propogation in Lossy Media Using the Low-Frequency Window for Video Pulse Radar Application", Proceedings of the IEEE, vol. 67, No. 7, Jul. 1979, pp. 981–990.
American Institute of Physics Handbook (1957), pp. 5–290, Fig. 5k-2, and pp. 3-126, 3-127, and 3-129.
Cauterman, et al., "Numerical Modeling for the Ground", Proceedings of the IEEE, vol. 67, No. 7, Jul. 1979, pp. 1009–1010.
Eastermann, "Classical Methods", Academic Press (1959), pp. 502–503.
Kupfmuller, "Einfuhrung in Die Theoretische Elektrotechnik", Introduction to Theorefical Electricity, Springer, Berlin (1932) p. 143.
Graeme, "Designing With Operational Amplifiers", The Burr-Brown Electronic Series, McGraw-Hill Book Co., (1977), pp. 182–185.
Moose, "The Gradient Magneto-Telluric Method at the Sea Floor", IEEE Transitions on Geoscience and Remote Sensing, vol. GE-19, No. 1, Jan. 1981, pp. 46–50.

(List continued on next page.)

Primary Examiner—Reinhard J. Eisenzopf
Assistant Examiner—Warren S. Edmonds
Attorney, Agent, or Firm—Robert C. Dorr

[57] ABSTRACT

An improved passive telluric current system for geophysical prospecting having a sensor responsive to the electric field component of the telluric current for producing a capacitive charge, a tuner for deconvoluting the sensed electric field telluric signal, and a cross-over circuit for generating a stereo audio output containing the telluric information into a low band audio signal and into a high band audio signal in order to enhance the frequency transitions contained in the telluric signal in the ears of the operator.

29 Claims, 12 Drawing Figures

OTHER PUBLICATIONS

Robinson, "Spectral Approach to Geophysical Inversion by Lorentz, Fourier, And Radon Transforms", Proceedings of the IEEE, vol. 70, No. 9, Sep. 1982, pp. 1039–1054.

Berg, et al., "The Physics of Sound", Prentice-Hall Inc. (1982), pp. 149–156.

Liboff, et al., Annals of the New York Academy of Sciences, vol. 238 Oct. 11, 1974, "Electrically Mediated Growth Mechanisms in Living Systems", pp. 321–323.

Weaver, "Electromagnetic Induction in Thin Sheet Conductivity Anomalies at the Surface of the Earth", Proceedings of the IEEE, vol. 67, No. 7, Jul. 1979, pp. 1044–1049.

Fischer, "Electromagnetic Induction Effects at an Ocean Coast", Proceedings of the IEEE, vol. 67, No. 7, Jul. 1979, pp. 1050–1060.

Pohl, "Elektrizitatslehre", (1955), Springer-Verlag, pp. 31 and 298.

"Disconcerting Notes", Currents, Science 84, vol. 5, No. 1, Jan./Feb. 1984, p. 7.

Mahmond, "Transient Electromagnetic Fields of a Vertical Magnetic Dipole on a Two-Layer Earth", IEEE Proceedings, pp. 1022–1029, Jul. 1979.

Kanasewich, "Time Sequence Analysis in Geophysics", University of Alberta Press (1973), p. 344.

Lee, "Transient Electromagnetic Waves Applied to Prospecting", Proceedings IEEE, Jul. 1979, pp. 1016–1021.

PASSIVE GEOPHYSICAL PROSPECTION SYSTEM BASED UPON THE DETECTION OF THE VERTICAL ELECTRIC FIELD COMPONENT OF TELLURIC CURRENTS AND METHOD THEREFOR

BACKGROUND OF THE ART

1. Related Application

The Assignee of the present invention is also the owner of design patent application Ser. No. 602,377, filed Apr. 20, 1984, for PASSIVE GEOPHYSICAL EXPLORATION DEVICE.

2. Field of the Invention

The present invention relates to geophysical prospecting involving the passive analysis of the earth's telluric currents and, in particular, to a portable analog apparatus and method therefor.

3. Discussion of the Prior Art

It is well known that the earth has naturally occurring sheets of telluric currents which flow along the earth's surface. Dobrin, "Introduction to Geophysical Prospecting", McGraw Hill (3rd Ed. 1976) pg. 591–619. The generation of these telluric currents are believed to be induced just below the earth's surface by the ionosphere, due to the solar influence on the atmosphere, by lightning discharges and by storms such as tornadoes. Id. at 596 and Wait, "Geo-Electromagnetism" (1982) Academic Press Inc., pg. 184. According to Wait, those telluric currents having durations of less than one or two seconds, with frequencies particularly in the audio portion of the radio spectrum, are produced primarily by lightning discharges.

Geophysical prospecting involving only the passive sensing of telluric currents has been reported by Dobrin, to have occurred as early as 1939 by Marcel Schlumberger and has found wide application for oil exploration primarily in Europe, North Africa, and Russia. Dobrin at 591. Telluric geophysical prospecting is passive and is unlike other forms of electromagnetic prospecting which require externally or artificially induced currents.

A number of passive telluric prospecting methods are set forth by Dobrin, Id., to include the telluric current method, the magnetotelluric method, and the natural alternating magnetic field method. An example of the latter is the AFMAG (Audio Frequency Magnetic Field) method for measurement of the natural oscillating magnetic fields at audio and sub-audio frequencies. The pulsating electromagnetic fields from the nonstatic and time variable telluric currents have an electric field, E(t), and a corresponding magnetic field, H(t), wherein:

$$E(t) = ZH(t) \qquad \text{Formula 1}$$

The complex impedance of the earth, Z, depends upon the magnetic, dielectric and conductivity properties of the earth. The electric field components are almost vertical and the magnetic field components are almost horizontal. The AFMAG method detects the horizontal magnetic components by means of coils or loops. By detecting two separate frequencies, such as 150 and 510 Hz, the ratio of the responses detected provides a measure of the conductivity of the underlying strata. According to Dobrin, the AFMAG method was particularly suitable for the detection of deep-seated structures such as faults and buried vertical dikes. Dobrin at 601. AMT (or Audio Magneto-Tellurics) utilizes frequencies from 20 to 4000 Hz, while MT (Magneto-Tellurics) uses frequencies from 1/1000 to 1 Hz. AMT uses normally a set of two or three fixed frequencies, e.g., 100, 200, 500 Hz and determines impedance, Z.

The magnetotelluric method plots the ratio of the earth's alternating magnetic field to the alternating electric field as a function of frequency to provide information on the variation of resistivity with depth. Hence, magnetotelluric methods involve the simultaneous measurement of the E(t) and H(t) fields at the same location over a frequency range. The method records five parameters from five detectors which sense both horizontal components of the E field and H field as well as the vertical component of the H field. The E fields are typically measured by nonpolarizing porous-pot electrodes made up of cadmium immersed in a cadmium chloride solution. Dobrin at 596.

Under the telluric current metod, electrodes are properly located on the ground to sense the voltage difference between locations caused by the oscillatory telluric currents. Dobrin at 592. As will be subsequently discussed the present invention is not properly categorized in any one of the above three categories.

It is recognized that a low frequency window (LFW) exists when telluric currents pass through the earth's substrata. In the frequencies of the LFW, the earth acts as a conductor. Burrell et al., "Pulse Propogation in Lossy Media Using the Low Frequency Window for Video Pulsed Radar Application", Proceedings of the IEEE, Vol. 67, No. 7, July 1979, pgs. 981-990. In the low frequency window, it is known that electric field waves coming from below the surface, upon impacting the interface between earth and air, approximately doubles because the voltage reflection coefficient is approximately plus one whereas the magnetic field, having a reflection coefficient of minus one, cancels. Id. at 982. Hence, it is recognized that antennas lying on the surface of the earth respond to such electric signals to generate a response. Id.

The low frequency window, LFW, has been recognized to exist from zero up to a cutoff frequency, $f_c$, as follows:

$$f_c = \frac{3.76 \times 10^6}{(2d)^2 \sigma} \qquad \text{Formula 2}$$

where:
 $2d$ = the distance to the observance point in meters
 $\sigma$ = the conductivity of the medium in mhos/m
 $f_c$ = the frequency at which the electric amplitude is 3 dB less than the value at zero frequency.

Id. at 984. Generally, the low frequency window is in the audio range and extends from zero Hz to several kHz depending on the earth's conductivity and depth.

In the above frequency cutoff formula, the determination of $f_c$ involves two unknowns (d and $\sigma$). The present invention provides a means to determine $f_c$ through a single observation of the electric field, E(t), of the telluric current. By definition depth, d, is a continuous variable, strongly influencing (by the square) the cutoff frequency, $f_c$; whereas the conductivity, $\sigma$, is a piece-wise constant variable changing only with a change in lithology (with each different strata layer) by less than a power of magnitude.

In FIG. 1a, the relationship between the log of the cutoff frequency and the log of the depth is shown for different values of conductivity. For example, for a conductivity of $10^{-2}$ mhos/m, as the depth increases to four units, the cutoff frequency drops correspondingly. It can be seen that at a depth of three units, the cutoff frequencies for different conductivity values stepwise changes. Therefore, if different substrata layers have different values of conductivity, the cutoff frequency is affected in a piece-wise constant manner. The resistivities of various typical substrata materials are set forth in the American Institute of Physics Handbook McGraw-Hill (1957), pg. 5-290, FIG. 5k-2. For example, depending on mineralization, sea water or brine has a resistivity of less than one ohm-meter whereas anhydrite has a resistivity of greater than 10,000 ohm-meters.

The present invention utilizes these distinctions between the depth, d, (i.e., affecting the cut-off frequency by the square) and the conductivity, $\sigma$, (i.e., affecting the cutoff frequency in a piece-wise or step function) to provide an indication of both the depth and the nature of substrata.

The present invention also takes advantage of another characteristic of telluric currents. The field pulsations originating from ionospheric and atmospheric sources also induce, in hydrocarbon or mineral deposits as shown in FIG. 1b, at a given depth, d, at a different conductivity, $\sigma_2$, a secondary telluric current, I(t), flowing at the boundaries of the volume, V, of the deposit in the form of a dipole moment I(t)L given by the following equation:

$$I(t)L = (\sigma_1 - \sigma_2)E(t)V \qquad \text{Formula 3}$$

where E(t) is the primary electric field strength penetrating the earth from the surface through the low frequency window to that depth. This is discussed in Cauterman, et al. "Numerical Modeling for Electromagnetic Remote Sensing of Inhomogeneities in the Ground", Proceedings of the IEEE, Vol. 67, No. 7, July, 1979, pg. 1010. The dipole moment I(t)L consists of a dipole distribution at the borders of the deposit, which produces a secondary pulsating electromagnetic field. These secondary field pulsations are delivered towards the surface of the earth in the form of an upgoing series of audio pulses, also band limited by the LFW. When these secondary pulses reach the surface, the following effects take place.

First, the electric field on the surface, as mentioned, is doubled whereas the magnetic field on the surface cancels. Secondly, the electromagnetic radiation reaching the surface from the air above behaves the opposite way. In other words, the electric field cancels on the surface because the reflection coefficient of the atmospheric electric field is minus one whereas the atmospheric magnetic field doubles.

Hence, the present invention is designed to sense the primary telluric currents in order to provide an indication of both the depth and nature of the substrata beneath the earth's surface and is further designed to sense the secondary telluric currents to provide an indication of the presence of hydrocarbons, minerals, and other inhomogeneities in the ground.

In FIG. 2 is set forth another type of prior art passive telluric current detector which utilizes a coil 200 oriented vertically to ground capable of detecting magnetic field component. The core of the coil is soft iron. A tuner 230 is connected to winding 210 over leads 212 and essentially comprises a variable capacitor which provides the tuning to the coil 200. The output of the tuner 230 is delivered into several stages of amplification 240 over leads 232. Part of the signal at the output of the amplifier 240 is delivered over line 242 to a second winding 220 which is wound opposite to winding 210 for approximately one-third the length of the coil 200. The output of the amplifier 240 is delivered over lines 242 to a detector 250. The detector is then interconnected over lines 252 to a pair of headphones 260. The details of the schematic shown in FIG. 2 are only partially known to the inventors and it is not understood by the inventors how the instrument truly operates. However, it is believed that the instrument detects magnetic waves H(t) with the coil 200 and delivers a signal over leads 212 into a tuner 230. The signals on leads 212 charge the tuning capacitor 230 and that signal is delivered into the amplifier 240 where a feed-back over line 240 effects a 180 degree phase shift to the signal causing the capacitor in tuner 230 to discharge thus enabling the tuner 230 to fully track the upcoming magnetic pulses which vary in time. It is believed that the phase shift caused by the feed-back on line 242 results in a composite signal on 212 that is comprised essentially of residues marking the beginning and the end of each charging pulse. The detector 250 of FIG. 2 is believed to be essentially a spike limiting amplifier which is necessary to eliminate man-made inference. The resulting pulse residuals are delivered over leads 242 to the detector 250 and then monaural audio signals are delivered into earphone 260. The prior art approach of FIG. 2 has been observed to work occasionally and only with a highly trained operator. The prior art approach works best during active or magnetic storm periods or for the detection of shallow highly conductive mineral veins.

While the aforesaid technique appears to directly measure the magnetic field, the measurement of the corresponding electric field in the atmosphere is discussed in Estermann, "Classical Methods", Academic Press (1959), pgs. 502-503. One early approach for measuring the electric field discussed in Estermann is the 1905 Wilson test plate method which utilized a horizontal conducting plate, a few square centimeters in area, connected to an electrometer. A shield is placed over the test plate. The Wilson technique provides an apparatus for measuring the earth's electric field by sensing the charge buildup on the test plate. Like the prior art approach discussed above in FIG. 2, the Wilson approach utilizes a variable capacitor to discharge the plate. The use of an electrometer or galvanoscope for sensing magnetic field or electric fields are well known. See Kupfmuller, Einfuhrung In Die Theoretische Elekrotechnik, "Introduction to Theoretical Electricity", Springer, Berlin (1932) pg. 143. However, these sensors are believed not to have been applied to geophysical prospecting systems.

The present invention, contrary to the above prior art, is a passive analog electromagnetic indicator responsive, in the preferred embodiment, to the electric field E(t), of the naturally occurring primary and secondary telluric currents in the earth through the low frequency window to depths of many thousands of feet in order to determine the presence of inhomogeneities such as oil, gas, water, coal, and minerals and additionally to provide an indication of their depth from the surface including a determination of the lithology of the overburden (i.e., limestone, sandstone, shale, and sands) and to specify the top and bottom depth of such overburdens. The present invention, in the preferred embodiment, is a field portable, battery operated, instrument which operates on or slightly above the earth's surface without the necessity of drilling a hole and which provides a stereo output to enhance the recognition of the telluric information.

In contrast to the above discussed prior art approaches especially that of FIG. 2 and the Wilson test plate method, the present invention matches the impedance of the sensor to the impedance of the ground in order to fully couple to the upcoming telluric current. In this fashion, the antenna in the horizontal position becomes part of the ground. In addition, the indicator of the present invention utilizes a low ohmic resistance to discharge the charge buildup in the sensor in synchronization with the electromagnetic field. The operator of the present invention is provided with a state variable filter and a deconvolution technique for indicating a solution to Formula 2 and, finally, by utilizing a stereo audio output, compensated for the operator's ear sensitivity and background noise, the signal interpretation produced by the indicator is significantly enhanced.

SUMMARY OF THE INVENTION

The present invention provides an improved system and method for geophysical prospecting of a particular subsurface strata under the earth's surface including a sensor responsive to the electric field component of the telluric current for producing a proportional output signal wherein impedance of the sensor is matched to the impedance of the ground, a tuner for deconvoluting the sensed telluric signal by adjusting the cutoff frequency of the low frequency window from its maximum value downwardly to $f_{min}$ wherein the tuner has a bandwidth with soft roll-off characteristics, and a crossover circuit for converting the deconvoluted signal from the tuner into a stereo audio signal having a low band audio output and a high band audio output for delivery to the left and right ears of an operator.

Under the teachings of the present invention, the provision of the stereo output enhances the frequency transitions created by the deconvolution of the telluric signal and makes their detection more readily apparent to the operator.

DESCRIPTION OF THE PREFERRED EMBODIMENT

Figure 3:
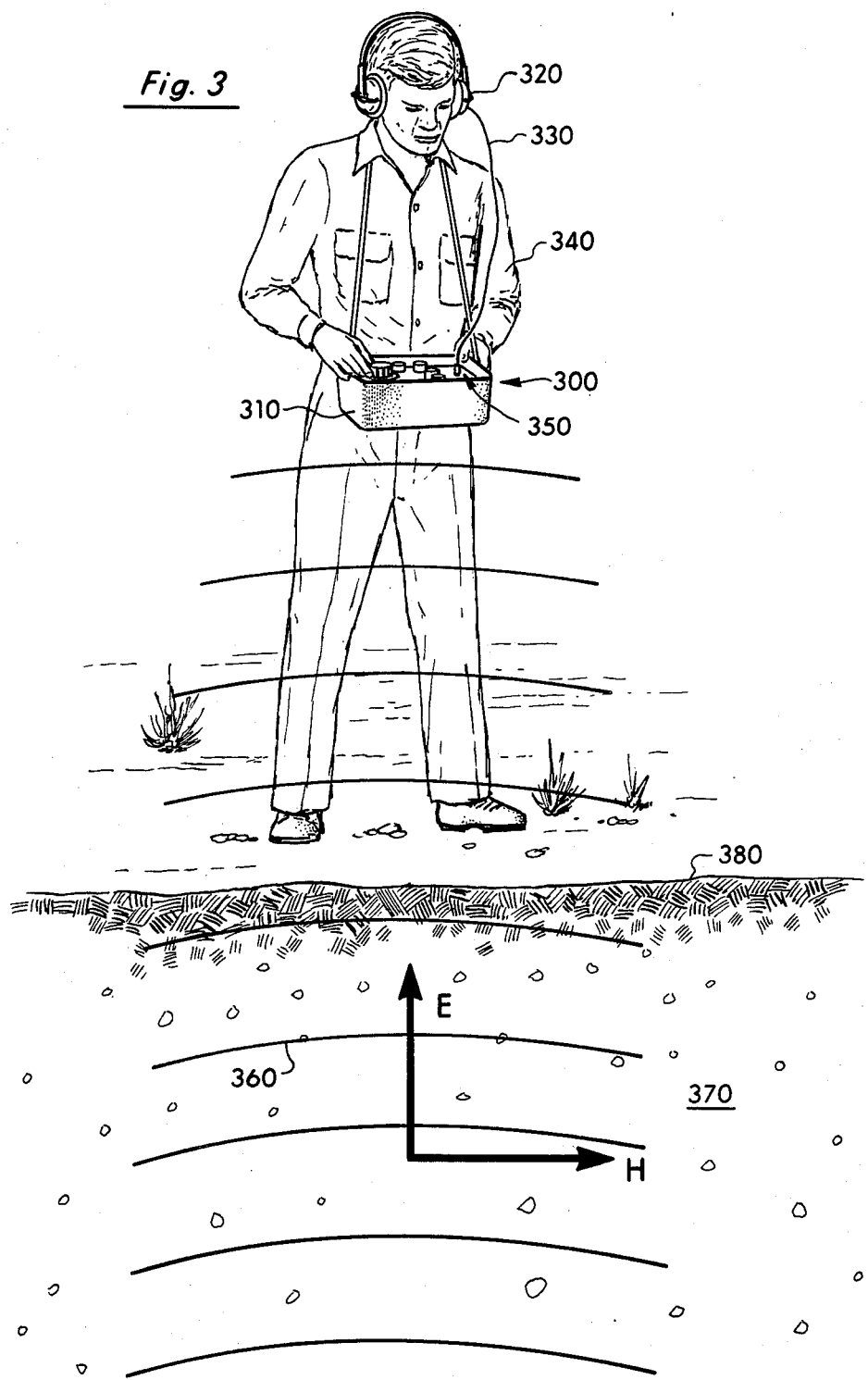
FIG. 3 is an illustration of the indicator of the present invention being used by an operator.

In FIG. 3, the telluric electric field indicator of the present invention 300 is set forth to include a housing 310 which is the subject of a design patent application, Ser. No. 602,377, "Passive Geophysical Exploration", and a set of earphones 320 interconnected to the housing 310 over cable 330. The operator 340 selectively adjusts the controls 350 of the sensor 300, in a fashion to be subsequently discussed, in order to sense, in the preferred embodiment, the vertical electric field component, E(t). While the preferred embodiment relates to the detection of the vertical electric field, E(t), it is to be expressly understood that the indicator of the present invention can be modified to sense the horizontal magnetic field H(t).

As can be observed, the indicator 300 of the present invention is field portable and contains its own power source. Furthermore, the indicator 300 can be held approximately one meter off the ground, as shown in FIG. 3, but it is to be expressly understood that it can be located either on the ground or in the near field vicinity of the ground under the teachings of the present invention. The indicator 300 is passive in that it detects only naturally occurring telluric currents waves 360 originating from the ground 370.

1. The Sensor 440

Figure 4:
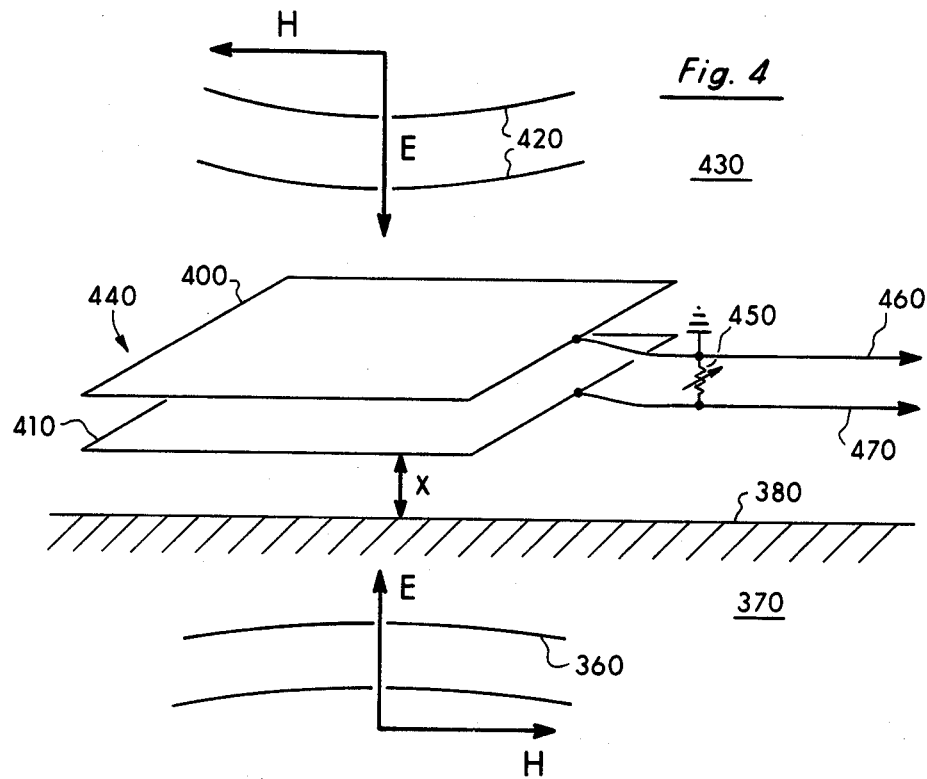
FIG. 4 is a schematic illustration showing the sensor of the present invention.

The indicator 300 of the present invention utilizes an electric field sensor contained in housing 310, shown in FIG. 4, comprising a capacitor consisting of two parallel metal plates 400 and 410. The metal plates 400 and 410 are oriented parallel to the surface 380 of the ground 370. As mentioned, the parallel plates can be located on the surface of the ground 380 or a predetermined distance "x" away from the surface of the ground as long as it is in the surface near field of the telluric currents 360. The metal plates 400 and 410 are preferably made from copper or aluminum and can be several square inches in area to several square feet in area. The size of the plates 400 and 410, the composition of the plates, and the distance between the plates are not as critical for the detection of the electric fields, E(t), of the telluric current 360 as is the substantial matching of the impedance of the sensor 440 to the impedance of the ground by a variable, low ohmic resistor 450. The size of the plates 440 is not critical, because they form for a pulsating field E(t) a high impedance, while the low ohmic resistor 450 dominates the impedance of the total sensor 440 and 450.

It is known that the time varying electric field, E(t), produces a charge Q(t) on the area, A, of the plate 400 by the pulsating dipole moment I(t)L. Because the impedance is matched to the complex impedance, Z, of the ground, it is mismatched to the impedance of air which is much higher and, therefore, the sensor 440 is relatively insensitive to any electromagnetic radiation 420 coming from the air 430. By matching the impedance of the sensor 440 to the impedance of ground, the charge Q(t) on plate 400 is maximized. As previously discussed, the electric field E(t) component from the telluric current 360 is doubled at surface 380 whereas the electric field component of the atmospheric radiation 420 is cancelled. Hence, the sensor 440 comprising the two parallel plates 400 and 410 essentially detects only the E(t) field component of the telluric currents 360. Because of the capacitive design of the sensor 440, the horizontal magnetic portion H(t) is not sensed. Furthermore, the magnetic field H(t) is out of phase with the electric field E(t).

The sensor 440 of FIG. 4 shows the upper plate 400 grounded and, therefore, the charge Q(t) builds up on the lower plate 410. It is to be expressly understood that the sensor 440 could be designed using only the lower plate 410 being appropriately spaced from the surface 380.

The charge of Q(t) would stay in the sensor 400 indefinitely thereby disabling the sensor if a resistor 450 were not provided in parallel with the impedance of the plates to shunt charge Q(t) to ground. Resistor 450 is a potentiometer and is set when the sensor 440 is manufactured. At the proper setting which is also the ohmic resistance being matched to the impedance of the ground the plates 400 and 410 charge and discharge with the pulsations 360 of E(t) from the ground.

In sum, the sensor 440 of the present invention maximizes the charge Q(t) due from the telluric current 360 by matching the impedance of the sensor to the impedance of the ground and minimizes any charge (or interference) from the atmospheric radiation by being mismatched to the impedance of air.

Figure 5:
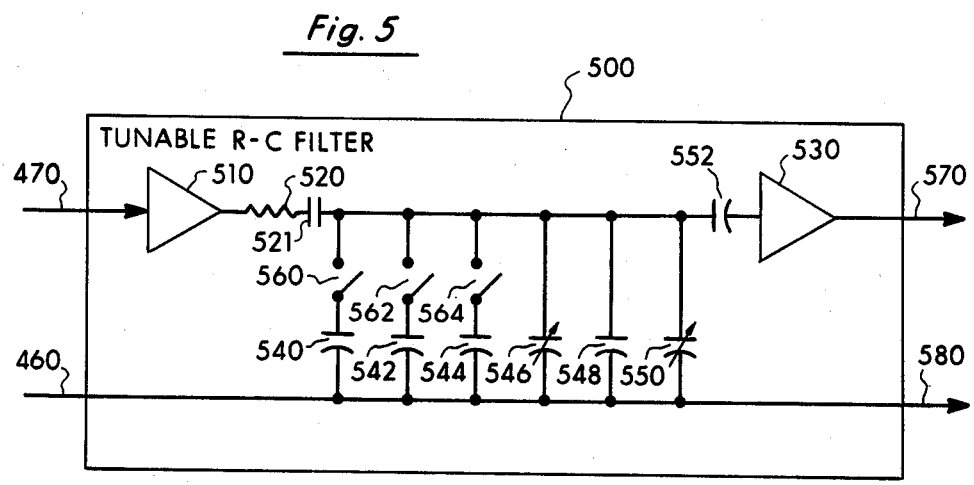
FIG. 5 is the schematic of the tunable RC filter of the present invention.

The output of the sensor 440 is delivered over short leads 460 and 470 to a tunable RC filter circuit as shown in FIG. 5.

2. The tunable RC Filter 500

The tunable RC filter 500 includes a first operational amplifier 510 receptive of coax 460 from the sensor 440. The operational amplifier 510 is of conventional construction manufactured by National Semiconductor Corp., Santa Clara, CA 95051, Model LF 356. The output of the operational amplifier 510 is delivered to resistor 520 into a decade box of tunable capacitors and also into the input of operational amplifier 530. Operational amplifier 530 is of the same design and model as above.

The bank of capacitors includes capacitors 540, 542, 544, 546, 548, and 550. All of the capacitors 540 through 550 are connected in parallel between lines 460 and 470 as shown in FIG. 5. Capacitors 540, 542, and 544 are connected in series with respective switches 560, 562, and 564. All of the capacitors 540 through 550 are in the picofarad range.

In operation, the tunable RC filter functions are as follows. The operational amplifier 510 provides a gain of 100 to 500 for the output signal appearing on line 570. In the preferred embodiment, capacitors 540, 542, and 544 represent a decade box for tuning the indicator 300 of the present invention for depths of 1000 foot increments. This is accomplished by selectively activating switches 560, 562, and 564. The capacitor 546 is a variable capacitor which provides the fine tuning in depths from within 1000 feet. Hence, if only the first 1000 feet of the earth 370 is to be analyzed, switches 560, 562, and 564 would remain open. Only capacitor 564 would be adjusted to select various depths within 1000 feet. However, should the analysis center on a depth between 1000 and 2000 feet, switch 564 would be switched in and capacitor 546 then selectively adjusted. Capacitor 548 provides overall bias. Variable capacitor 550 is for calibration which will be subsequently discussed in great detail. Capacitor 550 is adjusted in order to calibrate the indicator to a particular field based upon a known well log. Finally, capacitor 552 is an isolation capacitor.

The tunable RC filter of FIG. 5 has a 3 dB rolloff which will also be discussed in greater detail subsequently. It suffices to say, that in operation, the tunable RC filter is designed to start at the upper cutoff frequency $f_c$ of the frequency window LFW and by selectively adjusting the capacitance 540, 542, 544, and 546, the filter 500 is adjusted so that the amplified output on leads 570 and 580 are selectively tuned down to lower and lower frequencies of $f_{min}$. Hence, the RC-Filter has a frequency bandwidth limited to the low cutoff frequency, $f_c$, of the low frequency window, LFW.

It is to be expressly understood that while the preferred embodiment uses a tunable RC filter 500 as set forth in FIG. 5, that a number of different approaches could be utilized to detect the charge Q(t) appearing on leads 460 and 470 from the sensor 440. Since the sensor impedance is low (i.e., matched to ground) any impedance transformer network providing high ohmic output and bandlimited to the LFW could be used to detect the charge Q(t). One approach would be to use a conventional electrometer or coulombmeter of the type described in P. Horowitz and W. Hill, "The Art of Electronics", Cambridge University Press, 1980, Pg. 425–428. This type of circuit would theoretically approach the operation of a galvanoscope and it is basically equivalent to a capacitor. The output of the electrometer could be delivered to a differentiating amplifier where the charge Q(t) would be changed into a pulsating current:

$$i(t) = d/dt Q(t) \qquad \text{Formula 4}$$

An example of such a differentiating circuit is shown in J. G. Graeme, "Designing With Operational Amplifiers", The Burr-Brown Electronic Series, McGraw-Hill Book Company, 1977, Pg. 182–185.

At the outputs 460 and 470 of the sensor 440, information, Q(t) or I(t), appears which represent the sum total of all electric field components, E(t) (or magnetic field components H(t) if a magnetic sensor is used) of the upcoming telluric currents 360 appearing within the entire bandwidth of the LFW. See P. H. Moose, The Gradient Magneto-Telluric Method at the Sea Floor, IEEE Transactions on Geoscience and Remote Sensing, Vol. GE-19, No. 1, January 1981, Pgs. 46–50. This is due to the different electrical conductivities (or magnetic permeabilities), of the various lithological formations and/or mineral or hydrocarbon deposits found below the surface. Hence, data appearing on leads 460 and 470 are convoluted. In order to determine the nature of the substrata below and its depth, the data must be deconvoluted. This process has been termed "geophysical inversion" which seeks to determine the structure of the interior of the earth from data obtained at the surface. E. A. Robinson, "Spectral Approach to Geophysical Inversion by Lorentz, Fourier, and Radon transforms", Proceedings of the IEEE, Vol. 70, No. 9, September 1982, pg. 1039–1054. In his article, Robinson states: "Kac aptly described this inverse problem [referring to Lord Rayleigh's inverse problem treatment of a vibrating string] in the title of his well known lecture 'Can one hear the shape of a drum?'. Because seismic waves are sound waves in the earth, we can describe our inverse problem (i.e., seismic exploration) as 'can we hear the shape of an oilfield?' Robinson then proceeds to set forth mathematical models for treating the geophysical inversion problem based upon seismic waves. As will be fully discussed later, the purpose of the present invention is to provide a technique for actually hearing indications of the depth and of the characteristics of the underlying substrata including the presence of an oil deposit or the like.

In order, therefore, to determine the depth of different lithological formations, or the presence of absence of hydrocarbons coal, water or minerals, a deconvolution of the data appearing on lines 460 and 470 is necessary. This is accomplished by using the spectrum or Fourier transform of Q(t) or I(t).

A second embodiment and substitute for the tunable RC filter 500 of FIG. 5 is the conventional "state-variable active filter." This type of filter is described in P. Horowitz and W. Hill, Id., Pg. 160.

As mentioned, the deconvolution of the passive telluric data occurs at the tunable RC filter stage 500 or according to one of the alternate embodiments discussed above involving either an electrometer, with a differentiator circuit or with a state variable or tunable filter. Deconvolution is essentially obtained by using the spectrum or Fourier transform of Q(t) or I(t) in filter 500 of the preferred embodiment. The depth of the substrata is determined by solving Formula 2 for 2d:

$$2d = (3.67 \times 10^6 / f_c \sigma)^{\frac{1}{2}} \qquad \text{Formula 5}$$

Hence, by decreasing the cutoff frequency, $f_c$, greater depth can be obtained for signal analysis. According to the above formulation, the output occurring on lines 570 and 580 is essentially white noise corresponding to the transform of Q(t) or I(t), ranging from zero Hz to the cutoff frequency, $f_c$. Since the above formula is non-linear, and since according to the teachings of the present invention, a direct reading of depth scale is required, and bias capacitor 548 is bigger than capacitors 540, 542, 544. Thus, depth 2d relates linearly to the change $\Delta f_{co}$:

$$2d = \left(\frac{3.67 \times 10^6}{f_{co}\sigma}\right)^{\frac{1}{2}} \left(\frac{1\frac{1}{2} \Delta f_c}{f_{co}}\right) \qquad \text{Formula 6}$$

The bias capacitor provides a direct reading of the depth scale for the indicator for the present invention. Hence, to analyze depths down to thousands of feet, the decade capacitance 540, 542, and 544 are selectively switched in.

Figure 1A:
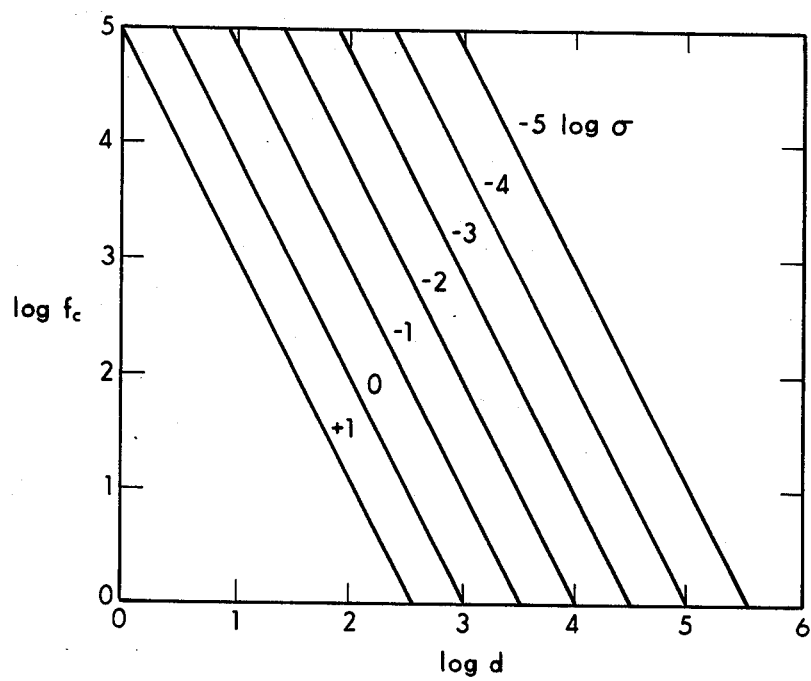
FIG. 1a is a graphical plot of formula 2 showing the step-wise relationship for different values of conductivity based on frequency and depth.

At this point, it is important to return to the mathematical problem of Formula 2. As mentioned, two unknowns exist so that the formula cannot be solved with one reading of the electric field of the telluric currents. However, the present invention provides an indication of the solution as follows. By setting the tunable filter of FIG. 5 to a depth of 2d and determining the cutoff frequency, $f_c$, then only a small error is present in the reading due to the steepness of the straight conductivity constant lines set forth in FIG. 1a.

Figure 6:
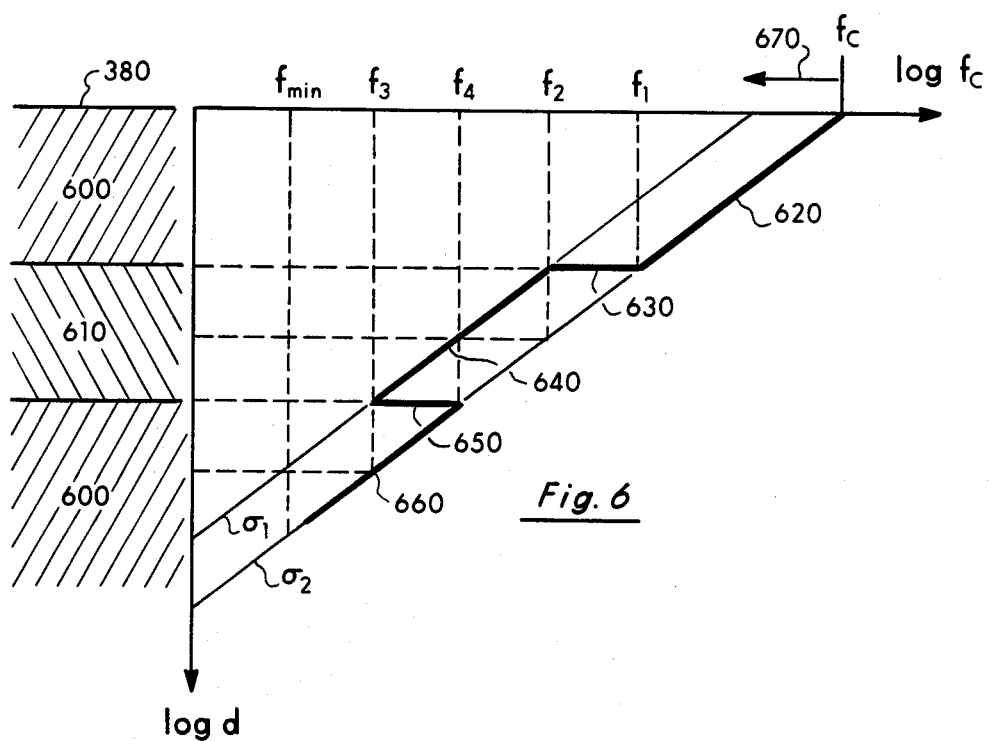
FIG. 6 is a graphical illustration of the step-wise change in cutoff frequency due to the transition between various layers of substrata.

FIG. 6 sets forth a plot of the log of depth versus the log of the cutoff frequency, for the example of a substrata comprised of layers of limestone 600 and shale 610, located below the earth's surface 380. Plotted on the graph of log d versus log $f_c$ are two conductivities, which as mentioned are constant for a given substrata. Hence, the conductivity for limestone 600 is shown as $\sigma_2$ and the conductivity for shale is shown as $\sigma_1$. Note how the cutoff frequency lowers as the depth increases linearly along line 620. However, when the cutoff frequency reaches the limestone 600-shale 610 interface it makes a step change to the conductivity curve along line 630. Likewise, as the depth is increased, the cutoff frequency is further linearly decreased along lines 640 corresponding to the conductivity line $\sigma$, for shale. However, at the shale 610-limestone 600 interface the cutoff frequency makes a step jump, increasing the value of the cutoff frequency by returning to the conductivity curve $\sigma_2$ for limestone 600. The cutoff frequency then follows a linearly decreasing curve 660 as shown. It can be seen that depth is a continuous variable strongly influencing by its square the cutoff frequency whereas conductivity influences the cutoff frequency only in step functions.

Figure 1B:
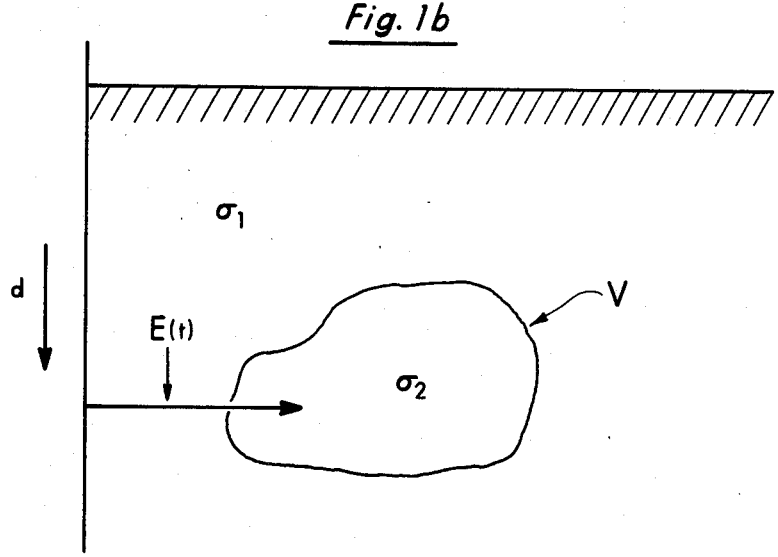
FIG. 1b sets forth an illustration showing the generation of an electric current dipole by an inhomogeneity located under ground.

Hence, as shown in Formula 6, the invention indicates the solution to this problem by continuously adjusting the tunable filter to depth 2d, and determining the cutoff frequency or vice versa. Hence, error is minimized due to the steepness and linearity of the conductivity curves as shown in FIG. 1. The error amounts to approximately ±25 to 50 feet and is defined by:

$$\Delta d = \left(\frac{(2d)^3 \sigma}{7.34 \times 10^6}\right) \Delta f_c \longrightarrow 0 \qquad \text{Formula 7}$$

For large depths, such as when oil is sought, the conductivity is $10^{-2}$ to $10^{-5}$ mhos and thus the error is small. At shallow depths, such as when prospecting for minerals conductivity equals 1 to $10^2$ ohms, the depth is small and thus delta $f_2$ is also small.

Now returning to the tunable filter circuit 500 of FIG. 5, to minimize the error in depth, resistor 520 and blocking capacitor 521 has impedance and this explains why the capacitors 540-550 are in Picofarads.

Hence, the tunable filter 500 of the present invention, according to the method of operation, is first set to a certain depth based upon a well known geophysical well log. The remaining deconvolution of the information consists of audibly determining the lithological nature of the underground formation and the presence or absence of buried inhomogenetities. Now differentiating equation respective to conductivity, one obtains:

$$\Delta f_c = \left(\frac{3.76 \times 10^6}{(2d)^2 \sigma^2}\right) \Delta \sigma = 0 \qquad \text{Formula 8}$$

As can be witnessed, this is not convergent to zero and sigma, therefore, represents a strong variable which is clearly illustrated in FIG. 6.

Clearly for a fixed depth, for example at 630 in FIG. 6, the cutoff frequency changes strongly as a function of the conductivity of the strata. Hence, under the method of the present invention, the capacitance 540, 542, 544, and 546 is selectively added to the tunable RC filter 500 to reduce the bandwidth of the circuit from $f_c$ into the direction of arrow 670 as shown. When capacitor 546 is adjusted to increase the capacitance and frequency f1 is reached, there is immediate change in the cutoff frequency to f2 which is not due to the tunable circuit 500 but rather due to the change in conductivity between limestone 600 and shale 610. This is because of the piece-wise discontinuity between $\sigma_2$ and $\sigma_1$ along line 630. Hence, as will be subsequently explained, this change can be audibly detected. As the capacitor 546 is further adjusted to f3—i.e., reducing the bandwidth of the tunable RC filter 500, the interface between shale 610 and limestone 600 is audibly detected because of the transition from $\sigma_1$ to $\sigma_2$ along line 650. Hence, even though the capacitor 546 reduces the bandwidth of the tunable RC filter 500 to f3, a sudden increase is audibly detected to frequency f4.

One may inquire as to how this can be audibly heard if the bandwidth of the filter 500 is now at f3. The reason for this is set forth in FIG. 7 which represents the roll-off characteristics of the tunable filter 500. This is termed a "soft roll-off characteristic" as opposed to a sharp or hard roll-off. Utilizing a soft roll-off characteristic of minus three to six dB per octave permits the transition from f3 to f4 as shown in FIG. 6 to be audibly discernible.

Hence, deconvolution of the signals at 460 and 470 is accomplished under the apparatus and method of the present invention by first determining the cutoff frequency at zero depth and at maximum depth and then by tuning from the cutoff frequency at maximum depth, as shown in FIG. 6, continuously from high values down to $f_{min}$. The amplified audio output on leads 570 and 580 as depth is increased (i.e., decreasing $f_c$) is substantially white noise characteristic of limestone 600 having a conductivity along line 620. Hence, as long as the limestone 600 is lithologically homogeneous, only small changes in that single bandwidth are observed. This is due to the steepness of $\sigma_2$. When the lithology changes from limestone 600 to shale 610, the conductivity undergoes a step change and there is an immediate bandwidth change from f1 to f2 essentially creating an audio change at the output 510. As will be discussed later, each different lithologic formation has its own characteristic white noise and, therefore, not only can the depth of each formation be determined by this method and apparatus but also the identity of the formation.

In sum, the present invention deconvolutes the charge Q(t) by indicating the solution to Formula 2. In the preferred embodiment a tunable RC filter is used and the observer tunes the filter by continuously varying capacitor 546 to decrease the cutoff frequency and, thereby, to increase the depth. For lithologically homogeneous strata only small changes in its characteristic white noise bandwidth response will be observed. However, a transition to a different strata will cause conductivity to step-wise change creating a transient spike at the output. Because of the soft roll-off characteristic of the tunable filter, the transient is enhanced and deconvolution is obtained. As mentioned it is possible to use other circuits designed to produce this function.

It is to be understood, that the method and apparatus of the present invention, at this stage, has generated analog information indicative of both the identity of the lithologic formation, the depth of the formation as well as the presence of any inhomogeneities contained therein. This output while not solving Formula 2 provides an audible indication to its solution.

3. The Cross-Over Circuit 800

Under the teachings of the present invention, the human ears are used as an ergonomic recognition system. It is recognized that the human mind can localize sound sources in space and that this process is termed a "binaural" phenomenon. Berg et al. "The Physics of Sound", Prentice-Hall Inc. (1982), pg. 155.

Figure 8:
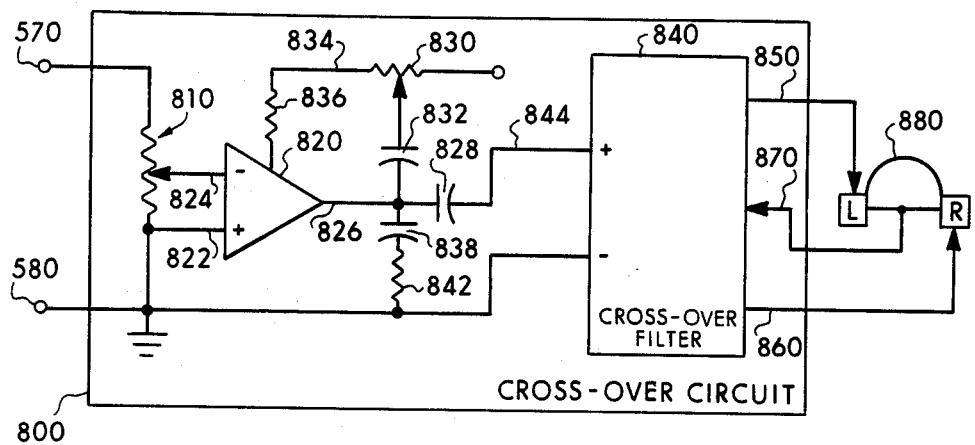
FIG. 8 is a schematic of the crossover circuit of the present invention.

Therefore, under the teachings of the present invention, the localization of stereo sound sources in space by the human mind represents the best "field portable" recognition system. In order to enhance the human ear's "bandwidth recognition", a cross-over circuit 800 is utilized as shown in FIG. 8 receiving the two inputs 570 and 580 from the tunable RC filter 500. The cross-over circuit 800 includes a potentiometer 810, an operational amplifier 820, a second potentiometer 830, and a cross-over filter 840. In the preferred embodiment, the potentiometer 810 is connected across inputs 570 and 580. Input 580 which is connected to ground is delivered into the plus input of operational amplifier 820 over line 822. The negative input of operational amplifier 820 is delivered over line 824 to the variable tap of potentiometer 810. The operational amplifier 820 is a Model LM386 and is preferably manufactured by National Semiconductor Corp., Santa Clara, CA 95051.

The output of the operational amplifier 820 is delivered over line 826 through an isolation capacitor 828 to the plus input of the cross-over filter circuit 840. The output 826 is also fed-back through capacitor 832 to the variable tap of potentiometer 830. The potentiometer 830 is connected over line 834 through fixed resistance 836 back into the operational amplifier 820 as a gain adjust control. The output 826 of the amplifier 820 is further delivered through capacitor 838 and resistor 842 to ground. The operational amplifier 820 contains other conventional interconnections to provide proper voltage and biasing.

The cross-over filter 840 is available as Model RS40-1296 such as that manufactured by The Radio Shack-Tandy Corporation, Fort Worth, Texas 76102. The line 580 is connected to the minus input of the cross-over filter 840 and line 844 is connected to the plus input of the cross-over filter 840. The output of the cross-over filter 840 is delivered over lines 850 to the left ear phone of speaker 860 and over line 860 to the right ear phone of speaker 860. The return path connection is provided over line 870 from the speaker 860 to the cross-over filter 840.

Figure 9:
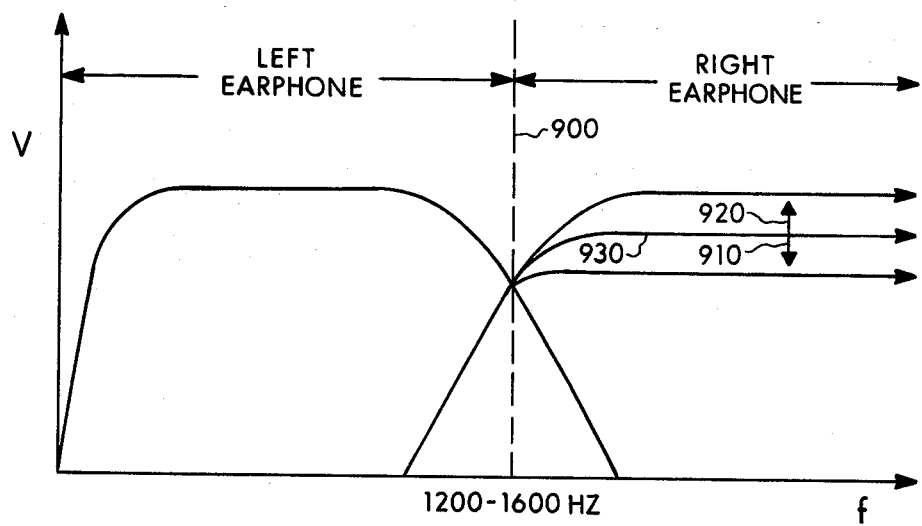
FIG. 9 is a graphical representation of the frequency response for the right and left earphones of the present invention.

The purpose of the cross-over circuit 800 of the present invention is to enhance the human ear's bandwidth recognition by using a high-low cross-over band pass filter to generate stereo sound in the operator's ears. Hence, two outputs are provided to the left and right ears of the operator creating essentially a stereo effect. This is essentially shown in FIG. 9 wherein the left earphone L receives the low band response over line 850 from the cross-over circuit 800 and the right earphone R receives the high band response over lines 860. The cross-over point 900 is between 1200 and 1600 Hz. Under the teachings of the present invention, a right handed operator has the bass or low band (i.e., from zero to a mid-audio frequency) applied to the left ear whereas a left handed operator would have the low band or bass supplied to the right ear. The high band (i.e., from the mid-audio frequency to a predetermined maximum audio frequency) for a high handed person is applied to the right ear. Hence, the configuration shown in FIGS. 8 and 9 is designed for right handed operators. Essentially, a stereo sensation in the operator's ears is created in which changes in the band width localizes a sound impression as wandering from the right ear to the left ear (and in the opposite direction for left handed operators). In the preferred embodiment, the following components are utilized:

Potentiometer 810—10 kohms
Potentiometer 830—50 kohms
Resistor 842—10 Ohms

Resistor 836—10 kohms
Capacitor 832—0.03 mf
Capacitor 838—0.03 mf
Capacitor 828—100 mf.

As indicated in FIG. 9 by arrows 910 and 920, the level 930 of the high band response from the cross-over circuit 840 can be adjusted by setting potentiometer 830. This provides two important functions under the teachings of the present invention. First, the sensitivity of the right versus the left ear of each individual operator can vary. Hence, the potentiometer 830 can be selectively adjusted to compensate for any difference in sensitivity between the two ears. Secondly, the earth's electromagnetic field may be active due to nearby storms and the low frequencies from such background noise tend to dominate or to mask the observed telluric signals.

The adjustment of potentiometer 830 by increasing the amplitude of the higher frequencies serves to normalize such noise. In other words, the compensation control 830 matches the left and right ear to the electric field activity so that any frequency changes which are being observed under the teaching of the present invention will still be observed.

4. Operation

Figure 10:
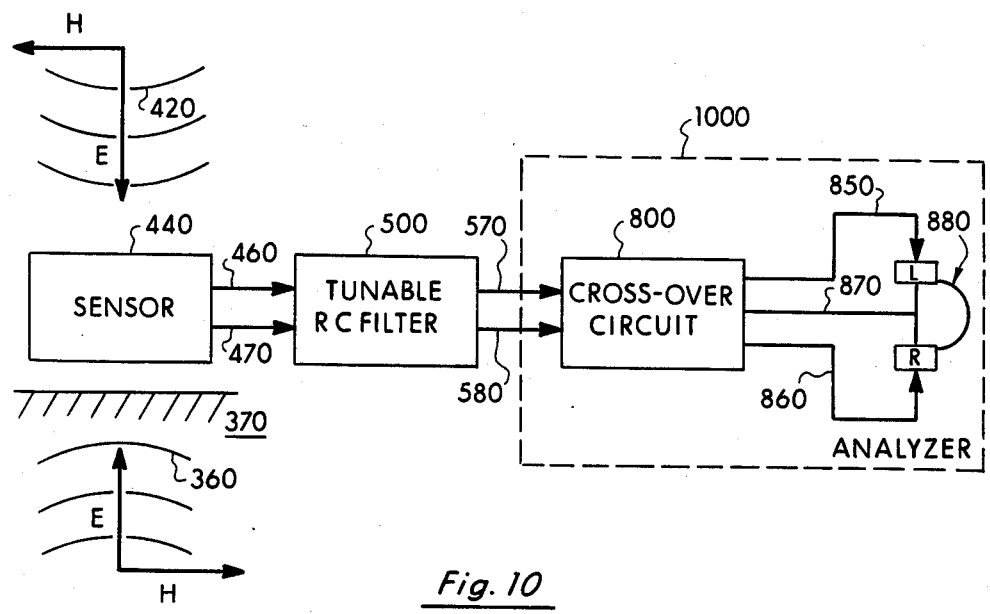
FIG. 10 is a block diagram showing the components of the indicator of the present invention.

The overall block diagram of the present invention is set forth in FIG. 10 to include the sensor 440 interconnected over lines 460 and 470 to the tunable RC filter 500. In turn, the tunable RC filter 500 is interconnected over lines 570 and 580 to the analyzer circuit 1000 which, in the preferred embodiment, contains a cross-over circuit 800 interconnected over lines 850, 860, and 870 to a pair of headphones 880.

Figure 11:
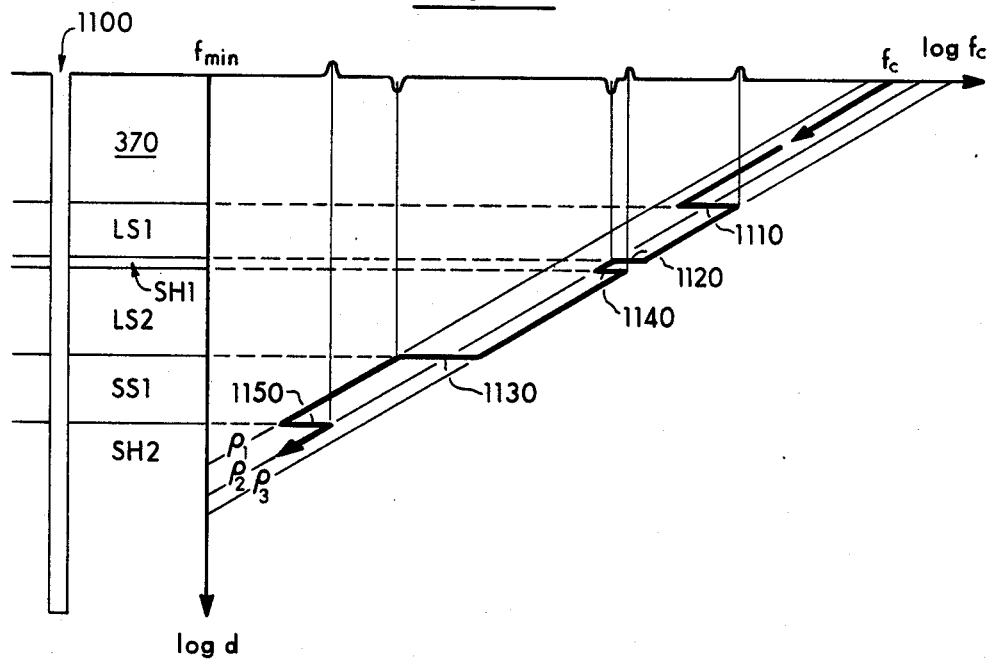
FIG. 11 is a graphical representation showing the operation of the indicator of the present invention.

The operation of the present invention as shown in FIG. 10 will now be discussed with reference to FIG. 11. FIG. 11 represents an illustration showing the earth 370 being comprised of a first layer of limestone, LS1, a first layer of shale, SH1, a second layer of limestone, LS2, a first layer of sandstone, SS1, and a second layer of shale, SH2. As set forth in FIG. 6, each separate substrata has a specific and constant conductivity. In this case, the conductivity for limestone layers LS1 and LS2 is assumed to be $\sigma_3$, the conductivity of the layers of shale SH1 and SH2 is assumed to be $\sigma_2$, and the conductivity of the sandstone SS1 is assumed to be $\sigma_1$. Hence, the log of the cutoff frequency $f_c$ is plotted alongside the log of the depth correlating it to the layers of substrata in earth 370. Also shown in FIG. 11 is a well bore hole 1100, which under the teachings of the present invention, is the preferred area where geophysical prospecting is selected. One or more bore holes 1100 in the area are selected and the device set forth in FIG. 10 of the present invention as well as a well log for the bore hole 1100 showing the substrata of the earth 370 is taken to the site of the bore hole 1100. At the site, the indicator is first compensated for the frequency response of the ears of the operator through adjustment of potentiometer 830 as well as compensating for the activity of the earth's electromagnetic field, as previously discussed. The potentiometer 830 is adjusted so that the response appears to be equal in both the left and the right ears of the operator.

The indicator of the present invention is then calibrated, as previously discussed, by adjusting capacitor 550 in the tunable RC filter 500 to compensate for local $\Delta\sigma$ of a given lithological formation, to minimize the error $\Delta d$. For example, the indicator may show a depth of 2310 feet for a particular lithological formation whereas the well log may show a depth of 2340 feet. Adjustment of capacitor 550 is made to calibrate the instrument to 2340 feet. Once calibrated, the capacitor 546 is set at the cutoff frequency $f_c$ as shown in FIG. 11. Through adjustment of capacitor 546 and the decade capacitors 540, 542, and 544, the indicator of the present invention is tuned slowly and continuously downward in frequency, i.e., reducing the low frequency window LFW.

What is being heard in the headphones 880 is generally white noise, in stereo, with the low band in the left ear and the high band in the right ear for the right-handed operator. Three "signatures" are to be detected in the operation of the indicator of the present invention. First, would be the presence of a change in frequency suddenly occurring in the white noise, second would be the characteristic of the white noise itself, and third would be the detection of any pulsating signals present in the white noise. These three "signatures" indicate the presence of hydrocarbons or minerals, the type of substrata, and the depth of the substrata. Each of these will be discussed in turn.

The white noise signature is characteristic of the type of substrata. Hence, limestones generally generate steady broad-band white noise, sandstones generate steady narrow-band white noise, whereas shales generate medium-band white noise.

Figure 7:
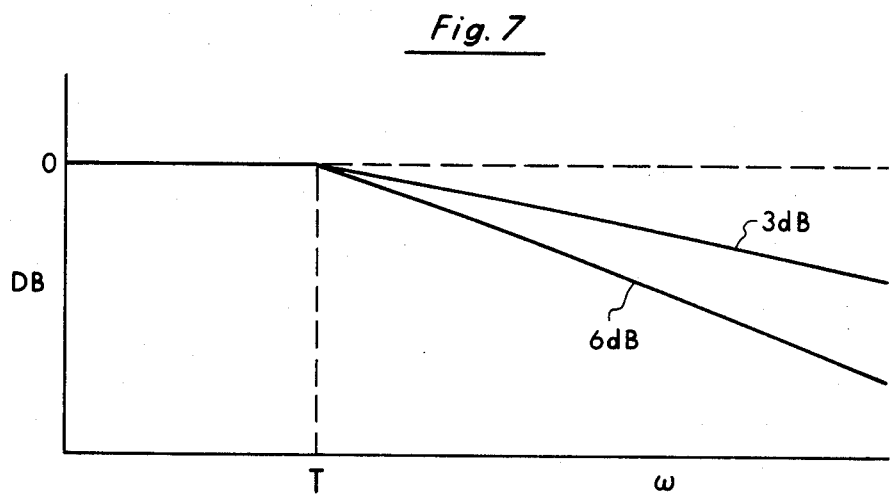
FIG. 7 is a graphical illustration showing the slow roll-off characteristics of the present invention.

The frequency change signature designates a transition between substrata as shown in FIG. 6 as lines 630 and 650. The sudden frequency change, which is caused by the change in conductivity of the substrata is a distinct increase or decrease in the cutoff frequency which is enhanced by the slow roll-off characteristics as shown in FIG. 7 of the tunable RC filter 500.

Figure 2:
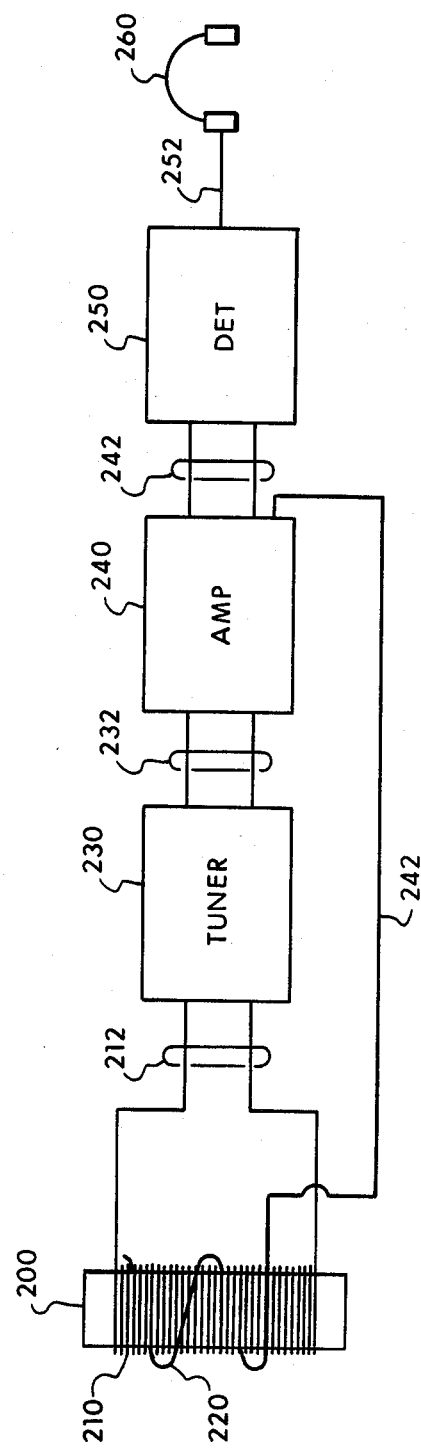
FIG. 2 is a schematic block diagram of a prior art passive-magneto-telluric indicating device.

The pulsating signature represents secondary telluric signals caused by the dipole moment created in a hydrocarbon or mineral deposit as previously discussed for FIG. 2. Hydrocarbons, for example, generate high treble fluctuations with up to 15 dB standard deviations whereas water exhibits treble noise with small fluctuations.

All of these signatures discussed above are dependent upon the nature of the lithology in the earth 370 and the signals are essentially dispersed in electrically lossy ground and hence signatures are a function of capillary effects, flow, pressure, sulfurization, temperature, and the viscosity of the various mediums which may vary from location to location.

Hence, under the teachings of the present invention, the operator at the site of a bore hole 1100 compares the output in headphones 880 with the well log and the depth indicator of the present invention as it is adjusted from the cutoff frequency, $f_c$, down to $f_{min}$ as shown in FIG. 11. The operator first adjusts the frequency $f_c$ down to the first transition 1110 and until that point hears steady medium to broad-band which noise. However, at depth 1110, according to the well log, limestone LS1 is encountered and there is an immediate transition of the cutoff frequency $f_c$ to a higher frequency because of the transition to limestone LS1. This frequency shift being from a lower frequency to a higher frequency is immediately detected in the mind of the operator because of a sudden frequency shift over the white noise from the left ear to the right ear. As the frequency $f_c$ is continuously tuned lower through adjustment of capacitor 546, a steady broad-band white noise (indicative of limestone) is heard until a second depth 1120 is achieved where suddenly the cutoff frequency shifts from a higher frequency to a lower frequency. The operator detects that frequency change through a sudden shift from the right ear to the left ear of the sound on top of the white noise. According to the well log, this is indicative of a layer of shale and the operator now hears a medium-band white noise until reaching a depth of 1130 wherein the second layer of limestone LS2 is encountered and a third frequency shift from a lower frequency to a higher frequency is detected by a frequency change from the left ear to the right ear of the operator. At this point, a steady broad-band white noise indicative of shale is once again heard until a depth of 1140 is achieved and a large frequency change from a high cutoff frequency to a low cutoff frequency is detected since a much higher conductivity indicative of sandstone is entered. This frequency shift is detected by a frequency transition from the right ear suddenly to the left ear. The operator now hears a narrow band white noise which is indicative of sandstone until a depth of 1150 is reached wherein there is a frequency shift from a low frequency to a high frequency and then the characteristic medium-band white noise is heard.

Hence, the operator of the indicator of the present invention can become trained to the particular audio-telluric signatures provided by the present invention characteristic of the lithography around a given well hole 1100. The operator can become trained to identify these signatures with known strata and to form a particular audio-dictionary for an area around the well hole 1100. Upon becoming trained, the operator of the present invention can then, in regions around the known well 1100, conduct geophysical prospecting based upon the specific signatures obtained. Based upon the response, the operator can ascertain the depth, characteristic of each substrata, and the presence of inhomogeneities such as oil, gas, or minerals.

It is important to recognize, however, that the overall environment is extremely noisy due to the extremely variable characteristics of the earth 370, the low strength of the telluric signals the radiation in the air, and the ability of the operator to detect the audio signatures. However, these difficulties especially with respect to atmospheric and telluric noise, are problems that are always faced in geophysical exploration whether by seismic or other electromagnetic techniques. The present invention provides an analog output in stereo mode that is extremely sensitive to these differences even in the presence of a noisy background.

In summary, the indicator of the present invention consists of a sensor 440, as shown in FIG. 10, responsive to the vertical electric field of telluric currents 360 for generating an output signal to a tunable RC filter 500 which provides deconvolution of the signal as a variable tuning capacitor is continuously tuned to reduce the cutoff frequency of the low frequency window. The output of the tunable RC filter is delivered into an analyzer circuit such as a cross-over circuit 800 for delivering three types of signatures into the ears of an operator indicating depth of the strata, the type of strata, and the presence of inhomogeneity such as hydrocarbons or minerals in the strata. Under the teachings of the present invention, the sensor 440 is impedance matched to the ground 370.

While the present invention has been described in several preferred embodiments, it is to be expressly understood that changes and modifications could be made thereto without departing from the scope of the invention as set forth in the following terms.

We claim:

1. A passive geophysical prospection system for determining the identity and depth of strata under the earth's surface by detection of the time-varying vertical electric field component of telluric currents from said strata, said strata having overburdens and inhomogeneities contained therein, said time-varying electric field component of said telluric currents having an audio bandwidth in a low frequency window from zero frequency to a high cutoff frequency and wherein said high cutoff frequency is related to the depth of said strata, said system being capable of outputting information to an operator corresponding to the prospection depth of said system and the identity of strata found at said prospection depth including the identity of said overburdens and inhomogeneities, said system comprising:

means responsive to said time-varying vertical electric field component of said telluric currents for producing an output signal, means connected to said producing means for adjusting the impedance of said producing means to maximize said output signal, when said output signal is maximized said impedance of said producing means substantially matches the impedance of said earth's surface and said output signal varies in time with said time-varying vertical electric field component, means connected to said adjusting means and receptive of said maximized output signal from said adjusting means for tuning said maximized output signal in said audio bandwidth by decreasing the high cutoff frequency end of said audio bandwidth, the value of said high frequency cutoff end of said audio bandwidth being indicative of said prospection depth in said strata, said tuning means being capable of extending all frequencies of said maximized output signal through said audio bandwidth as a tuned signal, said tuning means having soft roll-off characteristics of minus 3 dB to minus 6 dB per octave, and means connected to said tuning means and receptive of said tuned signal from said tuning means for generating an output containing said information corresponding to said identity of said strata including said identity of said overburdens and inhomogeneities at said prospection depth.

2. The system of claim 1 wherein said producing means comprises a pair of parallel plates oriented parallel to said earth's surface and located in the surface near field of said telluric currents including being located on said earth's surface.

3. The system of claim 2 wherein said adjusting means is a variable low ohmic resistor connected in parallel with the impedance of said parallel plates.

4. The system of claim 1 wherein said tuning means comprises a plurality of selectively adjustable capacitors to provide said tuning of said bandwidth.

5. The system of claim 1 wherein said prospection depth of said tuning means is set at the physical location of a well to correspond to the actual strata depth obtained from a log of said well.

6. The system of claim 1 in which said generating means comprises:

means connected to said tuning means and receptive of said tuned signal from said tuning means for outputting a low band audio signal and a high band audio signal, means connected to said outputting means and receptive of said low and high band audio signals from said outputting means for applying said low band audio signal to one ear of said operator and said high band signal to the other ear of said operator, said high and low band signals being capable of enhancing frequency shifts caused by conductivity changes in the strata being prospected in said ears of said operator as said high cutoff frequency end of said audio bandwidth is decreased thereby aiding said identification, and means in said applying means for selectively adjusting by said operator the amplitude of said high band and low band signals so that said high band and said low band signals are equally heard in said ears of said operator thereby compensating for differences in sensitivity between the ears of said operator and to compensate for low frequency noise in the earth's electromagnetic field.

7. A passive geophysical prospection system for determining the identity and depth of strata under the earth's surface by detection of the time-varying vertical electric field component of telluric currents from said strata, said strata having overburdens and inhomogeneities contained therein, said time-varying vertical electric field component of said telluric currents having an audio bandwidth in a low frequency window from zero frequency to a high cutoff frequency wherein said high cutoff frequency is related to the strata depth, said system being capable of outputting prospection information to an operator corresponding to the prospection depth and the identity of strata found at said prospection depth including the identity of said overburdens and inhomogeneities at said prospection depth, said system comprising:

means for sensing said vertical electric field component of said telluric currents, said sensing means being further capable of generating an output signal proportional to said vertical electric field component of said telluric currents, said sensing means further comprising:
(a) means responsive to said vertical electric field component for producing said output signal, and
(b) means connected to said producing means for adjusting the impedance of said producing means to maximize said output signal, when said output signal is maximized said impedance of said producing means substantially matches the impedance of said earth's surface, means connected to said sensing means and receptive of said output signal from said sensing means for tuning said output signal in said audio bandwidth, said tuning means comprising:
(a) first means connected to said sensing means and receptive of said output signal from said sensing means for amplifying said output signal into a first amplified signal,
(b) means receptive of said first amplified signal for deconvoluting said first amplified signal in said audio bandwidth of said first amplified signal by decreasing the high cutoff frequency end of said audio bandwidth, the value of said high cutoff frequency end of said audio bandwidth being indicative of said prospection depth of said strata, said tuning means being capable of extending all frequencies of said first amplified signal in said audio bandwidth as a deconvoluted signal, and
(c) second means connected to said deconvoluting means and receptive of said deconvoluted signal from said deconvoluting means for amplifying said deconvoluted signal into a second amplified signal, means connected to said tuning means receptive of said second amplified signal from said second amplifying means for generating a stereo audio output containing information corresponding to said identity of said strata including said identity of said overburdens and inhomogeneities at said prospection depth, said stereo audio output having a low band audio signal and a high band audio signal, and means connected to said generating means and receptive of said stereo audio output from said generating means for applying said low band audio signal to one ear of said operator and said high band audio signal to the other ear of said operator, said high and low band signals being capable of enhancing frequency shifts caused by conductivity changes in the strata being prospected in said ears of said operator as said high cutoff frequency end of said audio bandwidth is decreased thereby aiding said identification.

8. The system of claim 7 wherein said producing means comprises a pair of parallel plates oriented parallel to said earth's surface and located in the surface near field of said telluric currents including being located on said earth's surface.

9. The system of claim 7 wherein said adjusting means is a variable low ohmic resistor connected in parallel with the impedance of said producing means.

10. A subsurface geophysical prospection method for the passive detection of the time-varying vertical electric field component of telluric currents from strata under the earth's surface, said strata having overburdens and inhomogeneities contained therein, said time-varying electric field component of said telluric currents having an audio bandwidth in a low frequency window from zero frequency to a high cutoff frequency wherein said high cutoff frequency is related to the strata depth, said method being capable of outputting information to an operator corresponding to the prospection depth and the identity of strata found at said prospection depth including the presence of said overburdens and inhomogeneities contained therein, said method comprising the steps of:
(a) sensing said time-varying vertical electric field component of said telluric currents with a capacitive sensor in the surface near field of said telluric currents,
(b) generating an electrical signal from said capacitive sensor in response to the step of sensing said time-varying vertical electric field component,
(c) adjusting the impedance of the capacitive sensor to maximize said electrical signal in response to the step of generating the electrical signal,
(d) deconvoluting the maximized electrical signal in said audio bandwidth by decreasing the high cutoff frequency end of said audio bandwidth,
(e) indicating said prospection depth of said strata including said overburdens and inhomogeneities based upon the value of said high cutoff frequency end of said audio bandwidth in response to the step of deconvoluting said maximized electrical signal,
(f) generating in the ears of said operator on audible signal upon receipt of said deconvoluted maximized electrical signal, and
(g) determining the identity of said strata including said overburdens and inhomogeneities at said prospection depth in response to the step of generating said audible output signal generation.

11. A subsurface geophysical prospection method for the passive detection of the time-varying vertical electric field component of telluric currents from strata under the earth's surface, said strata having overburdens and inhomogeneities contained therein, said time-varying electric field component of said telluric currents having an audio bandwidth in a low frequency window from zero frequency to a high cutoff frequency, said high cutoff frequency being related to the strata depth, said method being capable of outputting prospection information to an operator corresponding to the prospection depth and the identity of said strata found at said prospection depth including the presence of said overburdens and inhomogeneities contained therein, said method comprising the steps of:

(a) sensing said time-varying vertical electric field component of said telluric currents from said strata with a capacitive sensor, (b) generating an electrical signal from said capacitive sensor in response to the step of sensing of said time-varying vertical electric field component, (c) adjusting the impedance of the capacitive sensor in order to maximize said electrical signal in response to the step of generating the electrical signal, (d) deconvoluting the maximized electrical signal in said audio bandwidth by decreasing the high cutoff frequency end of said audio bandwidth, (e) indicating the depth of said strata including said overburdens and inhomogeneities in response to the step of deconvoluting said maximized electrical signal, (f) extending all frequencies of said maximized electrical signal through said audio bandwidth as an audio signal in response to said step of deconvoluting said maximized electrical signal, (g) generating a stereo signal having a low band audio signal and high band audio signal in response to the receipt of said extended audio signal, (h) delivering said low band audio signal to one ear of the operator and said high band audio signal to the other ear of the operator, (i) adjusting the amplitudes of said delivered low band and high band audio signals by said operator so that said high band and said low band signals are equally heard in the ears of said operator thereby compensating for differences in sensitivity between the ears of said operator and to compensate for low frequency noise in the earth's electromagnetic field, (j) determining the identity of said strata including said overburdens and inhomogeneities in response to the step of generating said audible output signal generation.

(k) setting the depth indicated in step (e) to equal the well log depth of strata at the location of a well, and (l) repeating steps (a) through (j) for geophysical prospection in the area near said well.

12. A passive geophysical prospection system for determining the identity and depth of strata under the earth's surface by detection of the time-varying vertical electric field component of telluric currents from said strata, said strata having overburdens and inhomogeneities contained therein, said time-varying electric field component of said telluric currents having an audio bandwidth in a low frequency window from zero frequency to a high cutoff frequency, said high cutoff frequency being related to the depth of said strata, said system being capable of outputting prospection information to an operator corresponding to the prospection depth and identity of strata found at said prospection depth including the identity of said overburdens and inhomogeneities, said system comprising:

means responsive to said time-varying vertical electric field component of said telluric currents for producing a capacitive charge proportional to said time-varying vertical component, means connected to said producing means for adjusting the impedance of said producing means to maximize said capacitive charge, when said capacitive charge is maximized said impedance of said producing means substantially matches the impedance of said earth's surface and said capacitive charge varies in time with said time-varying vertical electric field component, said producing means being further capable of providing an output signal corresponding to said maximized capacitive charge, means connected to said producing means and receptive of said output signal from said producing means for deconvoluting said maximized output signal in said audio bandwidth by decreasing the high cutoff frequency end of said audio bandwidth, the value of said high cutoff frequency end of said audio bandwidth being indicative of said prospection depth in said strata, said deconvoluting means being capable of extending all frequencies of said maximized output signal through said audio bandwidth as a deconvoluted signal, said deconvoluting means having soft roll-off characteristics of minus 3 dB to minus 6 dB per octave, and means connected to said deconvoluting means and receptive of said deconvoluted signal from said deconvoluting means for generating a stereo audio output containing said prospection information corresponding to said identity of said strata including said overburdens and inhomogeneities at said prospection depth, said stereo audio output having a low band audio signal and a high band audio signal, means connected to said generating means and receptive of said stereo audio output from said generating means for applying said low band audio signal to a first ear of said operator and said high band audio signal to the second ear of said operator, said high and low band signals being capable of enhancing frequency shifts caused by conductivity changes in the strata at said prospection depth in said ears of said operator as said high cutoff frequency end of said audio bandwidth is decreased thereby aiding said identification, and means for selectively adjusting by said operator the amplitudes of said high band and low band signals so that said high band and said low band signals are equally heard in said ears of said operator thereby compensating for differences in sensitivity between the ears of said operator and to compensate for low frequency noise in the earth's electromagnetic field.

13. The system of claim 12 wherein said producing means comprises a pair of parallel plates oriented parallel to said earth's surface and located in the surface near field of said telluric currents including being located on said earth's surface.

14. The system of claim 13 wherein said adjusting means is a variable low ohmic resistor connected in parallel with the impedance of said parallel plates.

15. The system of claim 12 wherein said deconvoluting means comprises a plurality of selectively adjustable capacitors.

16. The system of claim 12 wherein said prospection depth of said deconvoluting means is set at the location of a well to correspond to an actual strata depth obtained from a log of said well.

17. A passive geophysical prospection system for determining the identity and depth of strata under the earth's surface by detection of the time-varying vertical electric field component of telluric currents from said strata, said strata having overburdens and inhomogeneities contained therein, said time-varyfing electric field component of said telluric currents having an audio bandwidth in a low frequency window from zero frequency to a high cutoff frequency and wherein said high cutoff frequency is related to the strata depth, said system being capable of outputting prospection information to an operator corresponding to the prospection depth and the identity of strata found at said prospection depth strata including the identity of said overburdens and inhomogeneities, said system comprising:
    means receptive of said time-varying vertical electric field component of said telluric currents for producing an electrical signal, said electrical signal being proportional to said time-varying vertical electric field component,
    means connected to said producing means and receptive of said electrical signal from said producing means for reducing the audio bandwidth of said electrical signal by decreasing the high cutoff frequency end of said audio bandwidth, the value of said high cutoff frequency end of said audio bandwidth being indicative of said prospection depth of said strata, and
    means connected to said reducing means and receptive of said audio signal from said reducing means for generating an output, said output carrying information corresponding to the identity of said strata at said prospection depth including the identity of said overburdens and inhomogeneities contained therein.

18. The system of claim 17 in which said producing means comprises a pair of parallel plates oriented parallel to said earth's surface and located in the surface near field of said telluric currents including being located on said earth's surface.

19. The system of claim 18 further comprising a variable low ohmic resistor connected across said parallel plates for adjusting the impedance of said parallel plates to maximize said electrical signal, when said electrical signal is maximized said impedance of said parallel plates substantially matches the impedance of said earth's surface.

20. The system of claim 17 in which said reducing means comprises:
    first means connected to said producing means and receptive of said electrical signal from said producing means for amplifying said electrical signal into a first amplified signal,
    means connected to said first amplifying means and receptive of said first amplified signal from said first amplifying means for deconvoluting said first amplified signal in said audio bandwidth by tunably filtering said audio bandwidth, and
    second means connected to said deconvoluting means and receptive of said deconvoluted signal from said deconvoluting means for amplifying said deconvoluted signal into said audio signal.

21. The system of claim 17 in which said reducing means has a bandwidth with soft roll-off characteristics of minus 3 dB to minus 6 dB per octave.

22. The system of claim 17 in which said output is a stereo audio signal.

23. A passive geophysical prospecting system for determining the identity and depth of strata under the earth's surface by detection of the time-varying vertical electric field component of telluric currents from said strata, said strata having overburdens and inhomogeneities contained therein, said system comprising:
    means receptive of said time-varying vertical electric field component of said telluric currents for producing an electrical signal, said electrical signal being proportional to said time-varying vertical electric field component of said telluric currents,
    means connected to said producing means and receptive of said electrical signal from said producing means for adjusting the impedance of said producing means to maximize said electrical signal, when said electrical signal is maximized said impedance of said producing means substantially matches the impedance of the earth's surface and said electrical signal varies in time with said time-varying vertical electric field component, and
    means connected to said adjusting means and operative upon said electrical signal from said producing means for reducing the audio bandwidth of said electrical signal by lowering the high cutoff frequency end of said audio bandwidth, the value of said high cutoff frequency end of said audio bandwidth being indicative of the prospection depth of the strata including said overburdens and inhomogeneities being prospected, said reducing means being capable of extending all frequencies of said maximized output signal through said audio bandwidth as an audio signal, said audio signal carrying prospection information corresponding to the identity of said strata including said overburdens and inhomogeneities at said prospection depth.

24. The system of claim 23 in which said producing means comprises a pair of parallel plates oriented parallel to said earth's surface and located in the surface near field of said telluric currents including being located on said earth's surface.

25. The system of claim 24 further comprising a variable low ohmic resistor connected across said parallel plates, said variable low ohmic resistor being adjustable to maximize said electrical signal, when said electrical signal.

26. A passive geophysical prospecting system for determining the identity and depth of strata under the earth's surface by detection of the time-varying vertical electric field component of telluric currents from said strata, said strata having overburdens and inhomogeneities contained therein, said system comprising:
    means receptive of the time-varying vertical electric field component of said telluric currents for producing an electrical signal, said electrical signal being proportional to said time-varying vertical electric field component,
    first means connected to said producing means and receptive of said electrical signal from said producing means for amplifying said electrical signal into a first amplified signal, means connected to said first amplifying means and receptive of said first amplified signal from said first amplifying means for reducing the audio bandwidth of said first amplified signal by lowering the high frequency end of said audio bandwidth, the value of said high cutoff frequency end of said audio bandwidth being indicative of the prospection depth of the strata including said overburdens and inhomogeneities being prospected, said reducing means being capable of extending all frequencies of said maximized output signal through said audio bandwidth as an audio signal, second means connected to said reducing means and receptive of said audio signal from said reducing means for amplifying said audio signal into a second amplified signal, and means connected to second amplifying means and receptive of said second amplified signal from said second amplifying means for generating an audio output, said audio output carrying prospection information corresponding to the identity of said strata including the presence of said overburdens and inhomogeneities contained therein at said prospection depth.

27. In a geophysical prospecting system for use by an operator, the method for determining the identity and depth of strata including overburdens and inhomogeneities contained therein under the earth's surface based upon detection of the time-varying vertical electric field component of telluric currents, and method comprising the steps of:

(a) sensing said time-varying vertical electric field component of said telluric currents with an element located in the surface near field of said telluric currents including being located on said earth's surface and said element being further located in a plane parallel to said earth's surface, (b) generating an electrical signal from said element in response to the step of sensing said time-varying vertical electric field component, (c) adjusting the impedance of said element in order to maximize said electrical signal in response to the step of generating the electrical signal so that the impedance of said element substantially matches the impedance of said earth's surface, (d) deconvoluting the maximized electrical signal to determine the depth of said strata including said overburdens and inhomogeneities by tunably filtering the bandwidth of said maximized electrical signal in response to the step of adjusting the impedance, and (e) generating an output signal corresponding to the identity of said overburdens and inhomogeneities in said strata at said depth in response to deconvoluting the maximized electrical signal.

28. In a geophysical prospecting system for use by an operator, the method for determining the identity and depth of strata including overburdens and inhomogeneities contained therein according to claim 27 in which the step of generating an output signal comprises the steps of:

generating an audio output signal having a low band audio signal and a high band audio signal in response to the deconvolution of said maximized electrical signal, applying the low band audio signal to the first ear of the operator and the high band to the second ear of the operator in response to the generation of said audio output signal, and adjusting the amplitude of the high and low band audio signals by said operator so that said high band and said low band signals are equally heard in the ears of said operator whereby transitions from high conductivity substrata to low conductivity substrata produce a frequency shift from a lower to a higher frequency in said second ear to said first ear and so that transitions from low conductivity substrata to high conductivity substrata produce a frequency shift from a higher frequency to a lower frequency from said first ear to said second ear.

29. A portable geophysical prospection apparatus for determining the identity and depth of strata under the earth's surface by detection of the time-varying vertical electric field component of telluric currents from said strata, said strata having overburdens and inhomogeneities contained therein, said system comprising:

a pair of parallel plates oriented parallel to said earth's surface and located in the surface near field of said telluric currents including being located on said earth's surface for producing an electrical charge proportional to said time-varying vertical electric field component of said telluric currents, said electrical charge carrying information corresponding to the identity and depth of said strata including the presence of said overburdens and inhomogeneities contained therein, a low ohmic resistor connected across said parallel plates, said low ohmic resistor being adjustable to maximize said electrical charge on said parallel plates and to produce an electrical signal proportional to said electrical charge, a first amplifier connected to said parallel plates and said low ohmic resistor and receptive of said electrical signal for producing a first amplified electrical signal, a tunable resistance-capacitance filter connected to said first amplifier and receptive of said first amplified signal from said first amplifier for selectively reducing the audio bandwidth of said first amplified signal by decreasing the high cutoff frequency end of said audio bandwidth, said tunable resistor-capacitor filter having a plurality of selectively adjustable capacitors to provide said reduction of said bandwidth and wherein the setting of said capacitors is indicative of said depth of the strata including overburdens and inhomogeneities being prospected, a second amplifier connected to said filter and receptive of said reduced audio bandwidth signal from said filter for producing a second amplified electrical signal, a cross-over filter connected to said second amplifier and receptive of said second amplified signal from said second amplifier for generating a low band audio signal and a high band audio signal, said low and high band signals containing information corresponding to the identity of said strata including said overburdens and inhomogeneities at said depth, said cross-over filter having a bandwidth with soft roll-off characteristics of minus 3 dB to minus 6 dB per octave, and means connected to said cross-over filter and receptive of said low band and high band audio signals from said cross-over filter for adjusting the amplitude of said high band and low band audio signals to be equal in amplitude.

* * * * *